Figure 1:
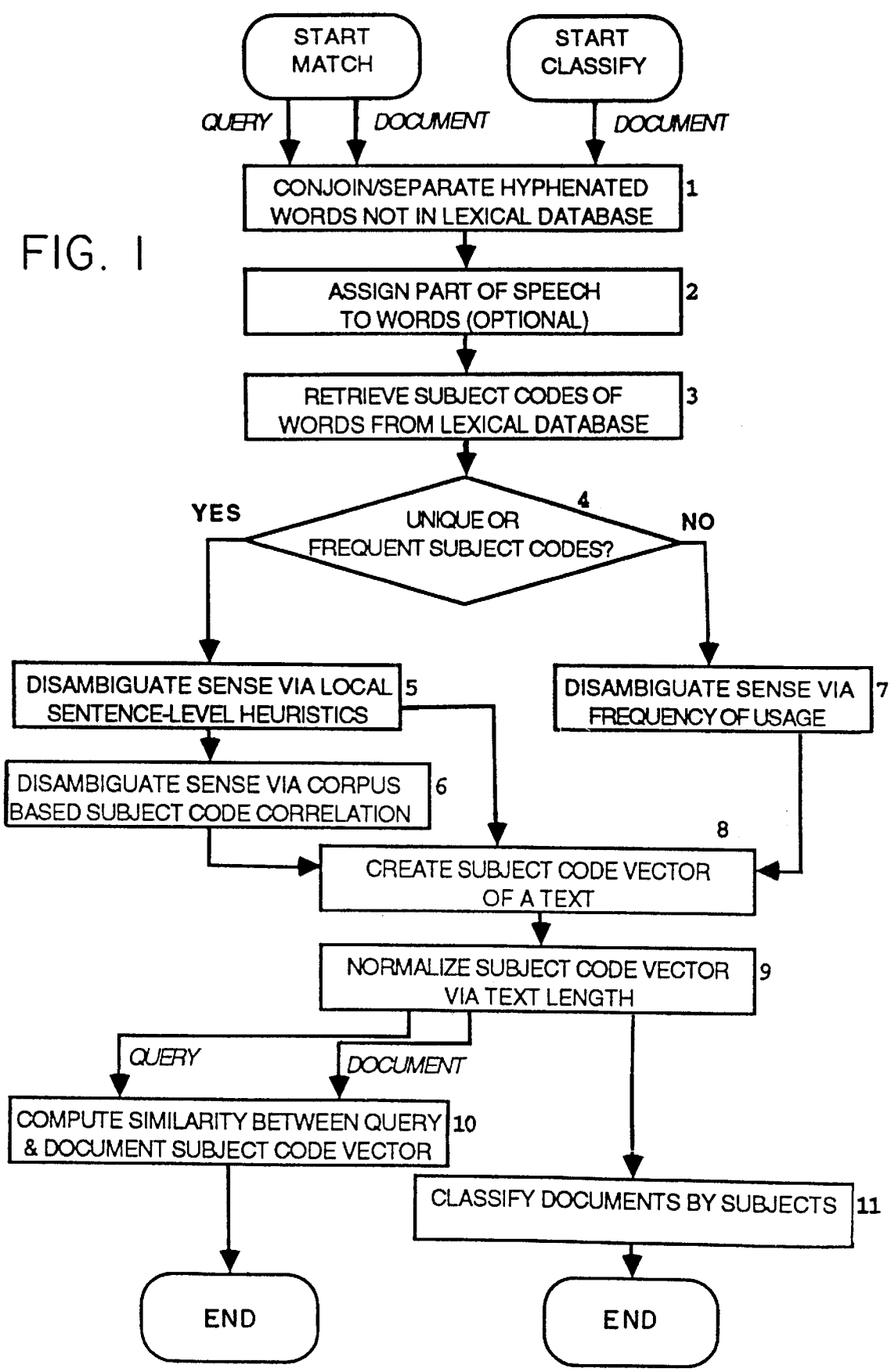
Figure 2:
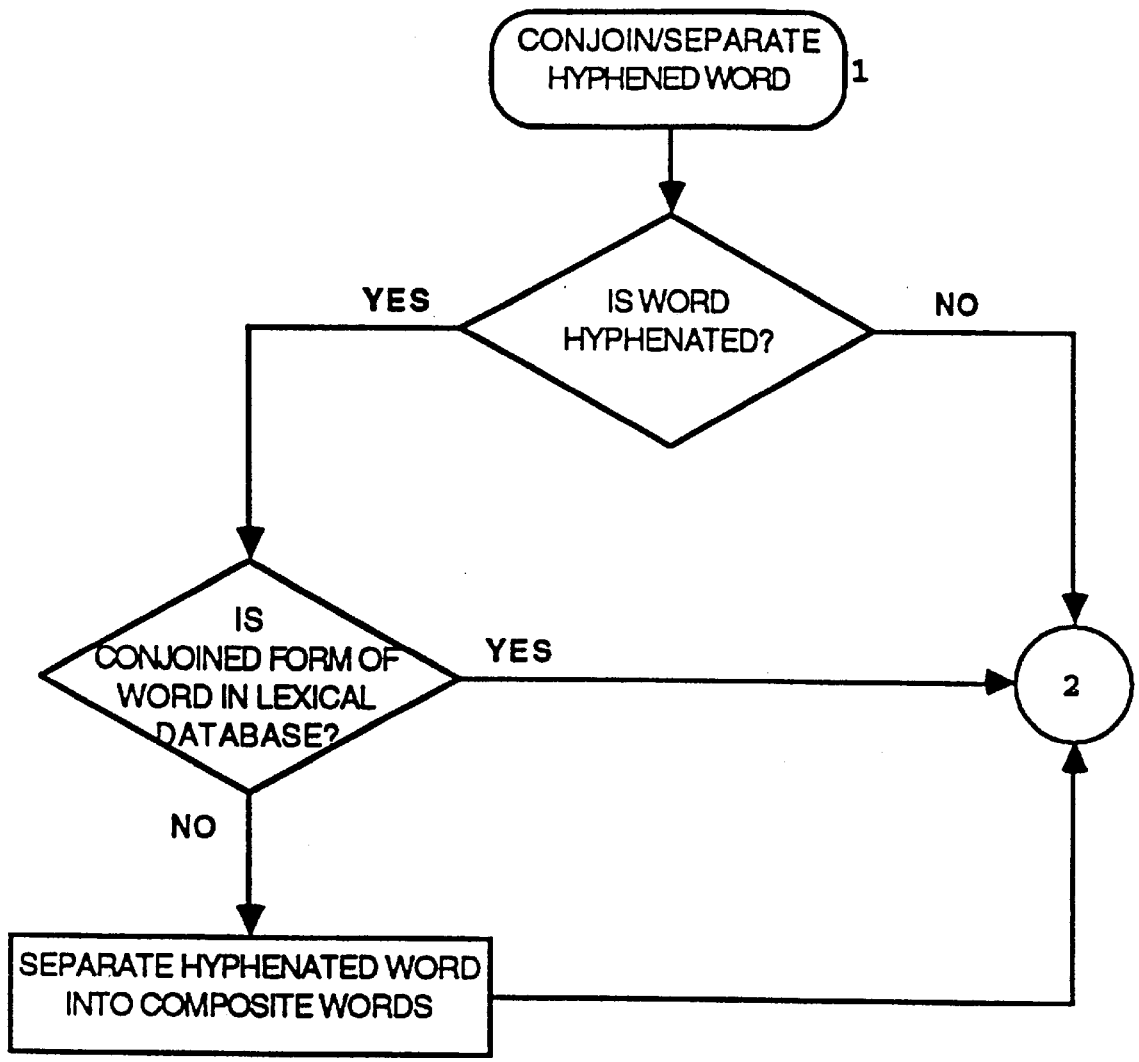

United States Patent [19]
Liddy et al.

[11] Patent Number: 5,873,056
[45] Date of Patent: Feb. 16, 1999

[54] NATURAL LANGUAGE PROCESSING SYSTEM FOR SEMANTIC VECTOR REPRESENTATION WHICH ACCOUNTS FOR LEXICAL AMBIGUITY

[75] Inventors: Elizabeth D. Liddy; Woojin Paik; Edmund Szu-li Yu, all of Syracuse, N.Y.

[73] Assignee: The Syracuse University, Syracuse, N.Y.

[21] Appl. No.: 135,815

[22] Filed: Oct. 12, 1993

[51] Int. Cl.⁶ ............................ G06F 17/30; G06F 17/20; G06F 17/22

[52] U.S. Cl. .................... 704/9; 707/1; 707/3; 707/101; 707/532

[58] Field of Search .............................. 395/600, 12, 63, 395/934; 364/419.01, 419.08, 419.13; 707/1, 104, 530, 532, 3, 101; 704/9, 10

[56] References Cited

U.S. PATENT DOCUMENTS

| | | | |
|---|---|---|---|
| 4,358,824 | 11/1982 | Glickman et al. | 364/419.19 |
| 4,495,566 | 1/1985 | Dickinson et al. | 395/600 |
| 4,580,218 | 4/1986 | Raye | 364/419.13 |
| 4,803,642 | 2/1989 | Muranaga | 395/62 |
| 4,823,306 | 4/1989 | Barbic et al. | 395/600 |
| 4,839,853 | 6/1989 | Deerwester et al. | 395/600 |
| 4,849,898 | 7/1989 | Adi | 364/419.1 |
| 4,868,733 | 9/1989 | Fujisawa et al. | 395/600 |
| 4,972,349 | 11/1990 | Kleinberger | 395/144 |
| 4,994,967 | 2/1991 | Asakawa | 364/419.08 |
| 5,020,019 | 5/1991 | Ogawa | 395/600 |
| 5,056,021 | 10/1991 | Ausborn | 364/419.08 |
| 5,099,426 | 3/1992 | Carlgren et al. | 364/419.13 |
| 5,122,951 | 6/1992 | Kamiya | 364/419.13 |
| 5,128,865 | 7/1992 | Sadler | 364/419.02 |
| 5,140,692 | 8/1992 | Morita | 395/600 |
| 5,146,405 | 9/1992 | Church | 364/419.08 |
| 5,151,857 | 9/1992 | Matsui | 364/419.13 |
| 5,162,992 | 11/1992 | Williams | 364/419.1 |
| 5,168,565 | 12/1992 | Morita | 395/600 |
| 5,197,005 | 3/1993 | Shwartz et al. | 364/419.13 |
| 5,237,503 | 8/1993 | Bedecarrax et al. | 364/419.18 |
| 5,285,386 | 2/1994 | Kuo | 364/419.02 |
| 5,297,039 | 3/1994 | Kanaegami et al. | 364/419.13 |
| 5,325,298 | 6/1994 | Gallant | 364/419.19 |

(List continued on next page.)

OTHER PUBLICATIONS

Meteer et al, "POST: Using Probabilities in Language Processing," Proc. 12th Intl. Conf. on A.I. vol. 12, Aug. 1991, pp. 960–964.

(List continued on next page.)

*Primary Examiner*—Paul V. Kulik
*Attorney, Agent, or Firm*—K. J. Lukacher; M. Lukacher

[57] ABSTRACT

A natural language processing system uses unformatted naturally occurring text and generates a subject vector representation of the text, which may be an entire document or a part thereof such as its title, a paragraph, clause, or a sentence therein. The subject codes which are used are obtained from a lexical database and the subject code(s) for each word in the text is looked up and assigned from the database. The database may be a dictionary or other word resource which has a semantic classification scheme as designators of subject domains. Various meanings or senses of a word may have assigned thereto multiple, different subject codes and psycholinguistically justified sense meaning disambiguation is used to select the most appropriate subject field code. Preferably, an ordered set of sentence level heuristics is used which is based on the statistical probability or likelihood of one of the plurality of codes being the most appropriate one of the plurality. The subject codes produce a weighted, fixed-length vector (regardless of the length of the document) which represents the semantic content thereof and may be used for various purposes such as information retrieval, categorization of texts, machine translation, document detection, question answering, and generally for extracting knowledge from the document. The system has particular utility in classifying documents by their general subject matter and retrieving documents relevant to a query.

46 Claims, 8 Drawing Sheets

U.S. PATENT DOCUMENTS

| | | | |
|---|---|---|---|
| 5,331,556 | 7/1994 | Black, Jr. et al. | 364/419.08 |
| 5,371,807 | 12/1994 | Register et al. | 382/14 |
| 5,418,951 | 5/1995 | Damashek | 707/5 |
| 5,541,836 | 7/1996 | Church et al. | 704/7 |
| 5,619,709 | 4/1997 | Caid et al. | 707/532 |
| 5,675,819 | 10/1997 | Schueteze | 704/10 |
| 5,694,592 | 12/1997 | Driscoll | 395/603 |

OTHER PUBLICATIONS

Liddy et al, Proc. Workshop on Natural Language Learning, IJCAI, Sydney, Australia, 1991, pp. 50–57, entitled "An Intelligent Seimantic Relation Assignor: Preliminary Work.".

Stephen I. Gallant, "A Practical Approach for Representing Context and for Performing Word Sense Disambiguation Using Neural Network," Neural Computation 3, pp. 293–309, Massachusetts Institute of Technology, 1991.

Yorick Wilks et al., "Providing Machine Tractable Dictionary Tools," Machine Translation, pp. 98–154, Jun. 1990.

Gerard Salton et al., Introduction to Modern Information Retreival, Mc–Graw–Hill Book Company, pp. 118–155, Apr. 1983.

Ellen M. Voorhees et al., "Vector Expansion in a Large Collection," Siemans Coporate Research, Inc., Princeton, New Jersey, Unknown.

Scott Deerwester et al., "Indexing by Latent Semantic Analysis," Journal of the American Society for Information Science, 41(6), pp. 391–407, 1990.

Hinrich Schutze, "Dimensions of Meaning," Proceedings Supercomputer '92, IEEE, pp. 787–796, Nov. 1992.

Gregory Grefenstette, "Use of Syntactic Context to Produce Term Association Lists for Text Retrieval," 18th Ann Int'l SIGIR '92, ACM, pp. 89–97, Jun. 1992.

Susan T. Dumais, "LSI meets TREC: A Status Report," NIST Special Publication 500–207, The First Text REtrieval Conference (TREC–1), pp. 137–152, Mar. 1993.

Elizabeth D. Liddy et al., "Statistically Guided Word Sense Disambiguation," Proceedings of the AAAI Fall 1992 Symposium on Probalistic Approach to Natural Language Processing, pp. 98–107, Oct. 1992.

Elizabeth D. Liddy et al., "Use of Subject Field Codes from a Machine–Readable Dictionary for Automatic Classification of Documents," Proceedings of the 3rd ASIS SIG/CR Classification Research Workshop, Pittsburgh, PA, pp. 83–100, Oct. 1992.

Elizabeth D. Liddy et al., "DR–Link's Linguistic Conceptual Approach to Document Detection," Proceedings of TExt Retrieval Conference (TREC), 13 pages, Nov. 1992.

Elizabeth D. Liddy et al., "An Overview of DR–Link and its Approach to Document Filtering," Proceedings of the Human Language and Technology Workshop, 5 pages, Mar. 1993.

NATURAL LANGUAGE PROCESSING SYSTEM FOR SEMANTIC VECTOR REPRESENTATION WHICH ACCOUNTS FOR LEXICAL AMBIGUITY

The present invention relates to systems (method and apparatus) for natural language processing which accounts for lexical ambiguity, and particularly to a system for the automatic classification and retrieval of documents by their general subject content with statistically guided word sense disambiguation.

Systems utilizing the invention are applicable generally for knowledge extraction from documents. By document is meant, a text, a unit of which is selected for analysis, such as a title, a clause, a sentence, any subpart or section of the document or the entire document. This system is useful for information retrieval, categorization of documents, machine translation, document detection (of certain texts out of an inventory of texts), question answering as to the content of a document, and other knowledge extraction and information retrieval purposes. A presently preferred embodiment of the system which is described in detail hereinafter is useful in classifying documents by their subject content and representing the documents by a vector representation derived from subject field codes assigned to the words of the document, and which enable retrieving of documents relevant to a query by matching a vector representing the query to vectors representing the documents.

Subject codes are found in a lexical database, which is a corpus having sets of definitions for different senses or meanings of a word and assigns subject codes thereto. Such a lexical database having subject codes, called subject field codes, may be the machine readable version of Longman Dictionary of Contemporary English published by Longman Group UK Limited, Longman House, Burnt Mill, Harlow, Essex CM22JE, England (1987-2d edition). A list of major subject codes is contained in Table A located at the end of this specification. There may also be subfield codes. Table 1 presents a sample of subject field codes from the machine-readable tape of the Longman dictionary (LDOCE).

TABLE 1

| | |
|---|---|
| DA | dance |
| DAzb | ballet |
| DAzn | names of dances |
| DAzc | choreography |
| DE | dentistry |
| DG | drugs (not pharm) and drug slang |
| DP | computer technology |
| EC | economics, finance |
| ECza | accounting |
| ECzb | banking |
| ECzk | bookkeeping |
| ECzm | mortgage and real estate |
| ECzs | stock exchange |
| ECzt | taxation |

Other lexical databases useful in systems embodying the invention may also be used, such as Word Menu (published by Random House).

Various systems for natural language processing which search lexical databases have been proposed as an alternative for conventional key word searching throughout every text in a database (such as databases containing all United States patents in full text). Such methods have involved syntactic relationship searching and used neural networks. See Liddy and Paik, An Intelligent Semantic Relation Assignor: Preliminary Work, Proceedings Workshop on Natural Language Learning, sponsored by IJCAI (International Joint Conference on Artificial Intelligence) Sydney, Australia 1991. See also, U.S. Pat. No. 5,056,021, issued to Ausborn on Oct. 8, 1991 and U.S. Pat. No. 5,122,951, issued to Kamiya on Jun. 16, 1992.

A problem with natural language processing to obtain representations of documents is that words may have multiple senses or meanings, referred to sometimes as polysemy. Table 2 is a simple example of this problem which shows an LDOCE entry for the word "acid" which has polysemy (multiple parts of speech and subject field codes).

TABLE 2

| HEADWORD | PART-OF-SPEECH | SUBJECT FIELDS (DOMAINS) |
|---|---|---|
| acid | noun | SI [Science] |
| | | DG [Drugs (not pharmaceutical] |
| acid | adjective | FO [Food] |
| | | XX [General] |

Accordingly, multiple subject codes represent a serious problem to natural language processing and particularly, to the representation of a document by a vector obtained from the subject codes of the words thereof.

It is a feature of the invention to provide a system which uses psycholinguistically justified sense disambiguation to select the appropriate, single subject code for words that have several meanings and therefore, have different subject codes in the lexical database. This system enables a word such as "drugs", which might refer to either medically prescribed remedies or illegal intoxicants that are traded on the street to be assigned a subject code based upon the context of the sentence in which it occurred. Accordingly, if synonymous words are used within a text, a system embodying the invention assigns each of them the same subject code, since they share a common domain (sense or meaning). Thus, different documents that discuss the same subject matter are handled by a system embodying the invention in a manner which generates similar subject code vector representations even though the vocabulary choices of the individual authors might be quite varied.

It is a feature of the invention to enable a user who seeks documents on the same subject matter or topic, even expressed in terms which do not match the vocabulary of any of the documents, to provide a query which would show high similarity to the representations of the documents because both the documents' representation and the query's representation represent the topic at an abstract, semantic field level, thereby making document retrieval more efficient than with conventional key word searching procedures.

Another feature of the invention is that the assignment of the subject codes is automatic and may be carried out under computer control without the need for human intervention. Obtaining representations of documents has heretofore required trained experts who must manually index with a thesaurus through a controlled vocabulary specifically created for the topic area of the database for which vocabulary representations are desired. The use of a lexical database enables the subject codes assignment to be automatic and efficient in that gigabytes of text may be processed in reasonable amounts of time. Accuracy in the subject code representations is practicable in that disambiguation is used, in accordance with the invention, in the assignment of the subject code.

Accordingly, it is the principal object of the invention to provide a system which produces a text level semantic representation of a document rather than a representation of each and every word in the document and particularly, a system which makes use of subject codes for the words in the document and accommodates the problem that frequently used words in natural language tend to have many senses and therefore, multiple subject field codes.

It is another object of the invention to provide a system for automatic classification of documents using subject codes having a disambiguator which operates in heuristic order and psycholinguistically, mimicking the human disambiguation process and is statistically guided.

It is a more specific object of the invention to provide lexical disambiguation in a system for semantic coding where words may preliminarily be tagged with multiple subject field codes which mimic human disambiguation and particularly, where automatic disambiguation is compared to human disambiguation in the manner set forth in Table 3.

TABLE 3

| Human Disambiguation | Automatic Disambiguation |
|---|---|
| local context | unique or high-frequency SFC within a sentence |
| domain knowledge | subject code correlation matrix |
| frequency of usage | preference of senses in lexical database |

In Table 3, local context is the sentence containing the ambiguous words; domain knowledge is the recognition that a text is concerned with a particular domain which activates only the human senses appropriate to that domain; and frequency of usage is that how commonly a term is used affects its accessibility.

In automatic disambiguation unique and high frequency subject codes within a sentence provide the local context which invokes the most appropriate code from the multiple codes for a word, which is ambiguous in that it has different meanings or senses. The subject code correlation matrix is based upon a large sample of text of the same type as the text being disambiguated and, therefore, equates to the domain knowledge that is called upon in the human disambiguation process. For example, if the type of text is newspapers, the correlation matrix correlates all subject field codes in a large sample of a typical newspaper, for example, The Wall Street Journal. These correlation components represent the probability that a particular subject code will co-occur with every other subject code in a text of the same type as the text used to create the matrix.

The ordering of the codes in the database may replicate the frequency of usage criteria used in human disambiguation or preference data may be indicated in the database.

Each step in automatic disambiguation is done in the heuristic order stated, that is, the unique or high frequency codes within a sentence are first sought, then the correlation matrix is used; and finally the order of senses is used. If an earlier step in the order, for example, if a unique code within the sentence is found, the search then terminates on the first step.

While subject field codes which are preferably used in a system embodying the invention are derived from a lexical database or lexicon, subject codes may be obtained from other semantic word knowledge sources and may be with a spectrum of semantic designators which provide, for example, semantic classification, subject domains and the like.

Briefly described, a system embodying the invention generates a vector of subject codes representing the semantic subject matter or content of a document. The system first is operative to assign subject code representations to each of the words of the document, the codes correspond to the meaning of each of the words in its various senses. In the assignment process, the words may be assigned to the part of speech thereof in the sentence under analysis. Then and if such part of speech (syntactic or grammatical part of speech for each word) is assigned, the set of multiple subject codes for each word which may be applicable is limited and only the subject codes for the part of speech for the word is assigned. A disambiguator then is used to select a specific subject code for each word in a sentence heuristically in order, namely, first from the occurrence of like codes within each sentence. The like codes may be a unique code or a code which occurs at greater than a certain frequency in the sentence. The certain frequency depends upon the type of text. Then, and second in the order, the codes are correlated with the unique or frequently occurring codes which are obtained for other words in the sentence and the code with the highest correlation is selected. Thirdly, in the heuristic order, frequency of usage in the language is utilized and the code for the most general or common meaning of the word is selected. The subject field code vector for the document is obtained by arranging the codes in a weighted and preferably length-limited vector. This code represents the context of the document. For retrieval, queries are likewise represented as subject field code vectors and matched to vectors in a database in which documents are presented for search as subject field code vectors. In order to expedite searching, the subject field code vectors may be clustered in accordance with their general similarity. The similarity between the subject field code vector of the query and the subject field code vector of each document may be represented in a ranked list in order of their similarity.

A system embodying the invention is described in detail hereinafter and also in the following articles authored, whole or in part, by the inventors thereof.

1. Elizabeth D. Liddy and Woojin Paik, Statistically Guided Word Sense Disambiguation, Proceedings of AAAI Fall 1992 Symposium on Probabilistic Approach to Natural Language Processing, Oct. 22–24, 1992.

2. Elizabeth D. Liddy, Woojin Paik and Joseph K. Woelfel, Use of Subject Field Codes from a Machine-Readable Dictionary for Automatic Classification of Documents, Proceedings of the 3rd ASIS SIG/CR Classification Research Workshop, Pittsburgh, Pa., USA, Oct. 25, 1992.

3. Elizabeth D. Liddy and Sung H. Myaeng, DR-Link's Linguistic-Conceptual Approach to Document Detection, Proceedings of Text Retrieval Conference (TREC), Nov. 4–6, 1992.

4. Elizabeth D. Liddy, Woojin Paik, Edmond S. Yu and Kenneth A. McVearry, An Overview of DR-Link and its Approach to Document Filtering, Proceedings Human Language and Technology Workshop, Mar. 24, 1993.

These articles present data showing the accuracy and efficiency of systems provided in accordance with this invention. Copies of the articles are filed with this application.

The foregoing and other objects, features and advantages of the invention as well as a presently preferred embodiment thereof will become more apparent from a reading of the following description in connection with the accompanying drawings in which:

FIG. 1 is a diagram illustrating a flow chart showing a system for subject field vector generation and document classification and retrieval which embodies the invention; and FIGS. 2 through 11 are flow charts of modules 2 through 11 of the system shown in FIG. 1.

Referring to FIGS. 1 through 11 there is shown a natural language processing system, which generates from unformatted naturally occurring text, a representation of the meaning (context) of the text of a document in the form of subject field codes. The system is implemented by programming a general purpose digital computer to operate in accordance with the flow charts (FIGS. 1–11). The terms subject code and subject field code (SFC) are used synonymously herein. The vector representation contains a sequence of weighted numbers on each SFC. It may be a digital number having a plurality of bytes each of which represents a different SFC. It is referred to as a slot vector with a slot for each different SFC representing number. This is a digital number and may be used for machine searching. Preferably the vector is a frequency weighted, fixed length vector of the SFCs occurring in each of the documents being classified or in a query which is presented to the system for classification. The frequencies of occurrence in the document of the SFCs is used to determine their weights. The vector preferably is normalized to be of the same length (number of bytes) regardless of the length of the document.

The system shown in FIG. 1 matches each query SFC vector to the SFC vector of incoming documents which may then be ranked on the basis of similarity. Matching occurs after classification (generation of its vector representation) in process 10 in the FIG. 1 flow chart. Those documents whose SFC vectors exceed a predetermined criterion of similarity to the query SFC vector can be displayed to the user. The lexical database which is used determines the SFCs. In the case of the LDOCE there are a hundred and twenty-four SFCs as shown in Table A located at the end of this specification. The LDOCE has many words defined under XX (general) or CS (closed system part of speech) categories. There may be additional categories or subfield SFCs. An example of a subfield SFC for the word "acid" in one meaning thereof may be SIzc for the meaning science, chemistry and FOzc for food, cookery. The herein described presently preferred embodiment of the system does not utilize subfield codes. Subfield codes may be contained in other lexical databases.

A sample Wall Street Journal document and the values which are located in the SFC slots of the frequency weighted fixed length vector of the SFCs for the document is contained in Table 4.

TABLE 4

| LAW - LW | .2667 | SOCIOLOGY - SO | .1333 |
|---|---|---|---|
| BUSINESS - BZ | .1333 | ECONOMICS - EC | .0667 |
| DRUGS - DG | .1333 | MILITARY - MI | .0667 |
| POLITICAL SCIENCE | .1333 | OCCUPATIONS - ON | .0667 |

Returning to FIG. 1 there are two paths, one for matching and the other for classification. In the matching path both the query and successive documents are classified by the system and the similarity between the query and the successive documents subject code vectors is computed in process 10. A document may be classified and a subject field code vector generated by the system following the path starting at the start classification entry into the system flow chart shown in FIG. 1.

The first process in classification whether of a query or of documents and in the generation of their respective SFC vector representations, is the conjoined/separate hyphenated word process 1. This process is a module as shown in the FIG. 2 flow chart. If the hyphenated word cannot be found in the lexical database, the hyphen is removed and the conjoined result is searched in the lexical database as a single word. If the conjoined word is not found, the system reseparates the words and searches each composite part of the hyphenated word as a separate word.

The next process is to assign a part of speech to each word in the document. This is an optional process and may be omitted. A probabilistic part of speech tagger (POST) developed by BBN Systems and Technologies of 10 Moulton Street, Cambridge, Mass. 02138 USA may be used. This system operates on a Markov model with Markov independence assumption. The POST system tags the parts of speech of words in sentences of a document.

Consider the following example of a simple sentence "Terms were not disclosed." The POST system tags this sentence as follows "Terms" (tag, plural noun); "were" (tag, past tense verb); "not" (tag, adverb); "disclosed" (tag, past participle verb).

The model in the POST system assumes that to know the most likely tag sequence, T, given a particular word sequence, W is desired. Using Bayes' rule the as posteriori probability of tag sequence WT given word sequence which is represented in the following equation is used $$P(W|T) = \frac{P(T)P(W|T)}{P(W)}$$

where P(T) is the priori probability of tag sequence T, P(W|T) is the conditional probability of word sequence W occurring giving that a sequence of tags T occurred, and P(W) is the unconditioned probability of word sequence W. Then possible tag sequences may be evaluated for the posterior probability of each, and the one that is highest chosen. Since W is the same for all hypothesized tag sequences, P(W) is disregarded.

The probability of each sequence as a product of the conditional probabilities of each word or tag given all of the previous tags may be represented as follows $$P(T|W)P(W) = \Pi p(t_o)p(t_1|t_o)p(t_i|t_{i-1}, t_{i-2}, \ldots)$$

$$p(w_i|t_i \ldots, w_{i-1})$$

Then the approximation is made that each tag depends only on the immediately preceding tags (say the two preceding tags for a tri-tag model), and that the word depends only on the tag, as represented by the following equation $$P(T|W)P(W) = p(t_o)p(t_1|t_o)\Pi p(t_i|t_{i-1}, t_{i-2})$$

$$p(w_i|t_i)$$

The use of POST thusly assigns a part of speech (syntactic or grammatical category) to each composite part of speech and results in information which may be used to limit the number of applicable SFCs in a plurality of SFCs which may represent a word in the document.

For further information respecting POST see an article by Marie Meteer, Richard Schwartz and Ralph Weischedel, entitled "POST: Using Probabilities in Language Processing" which appeared in the Proceedings of the Twelfth International Conference on Artificial Intelligence, Volume 2, Aug. 24–30, 1991.

Figure 3:
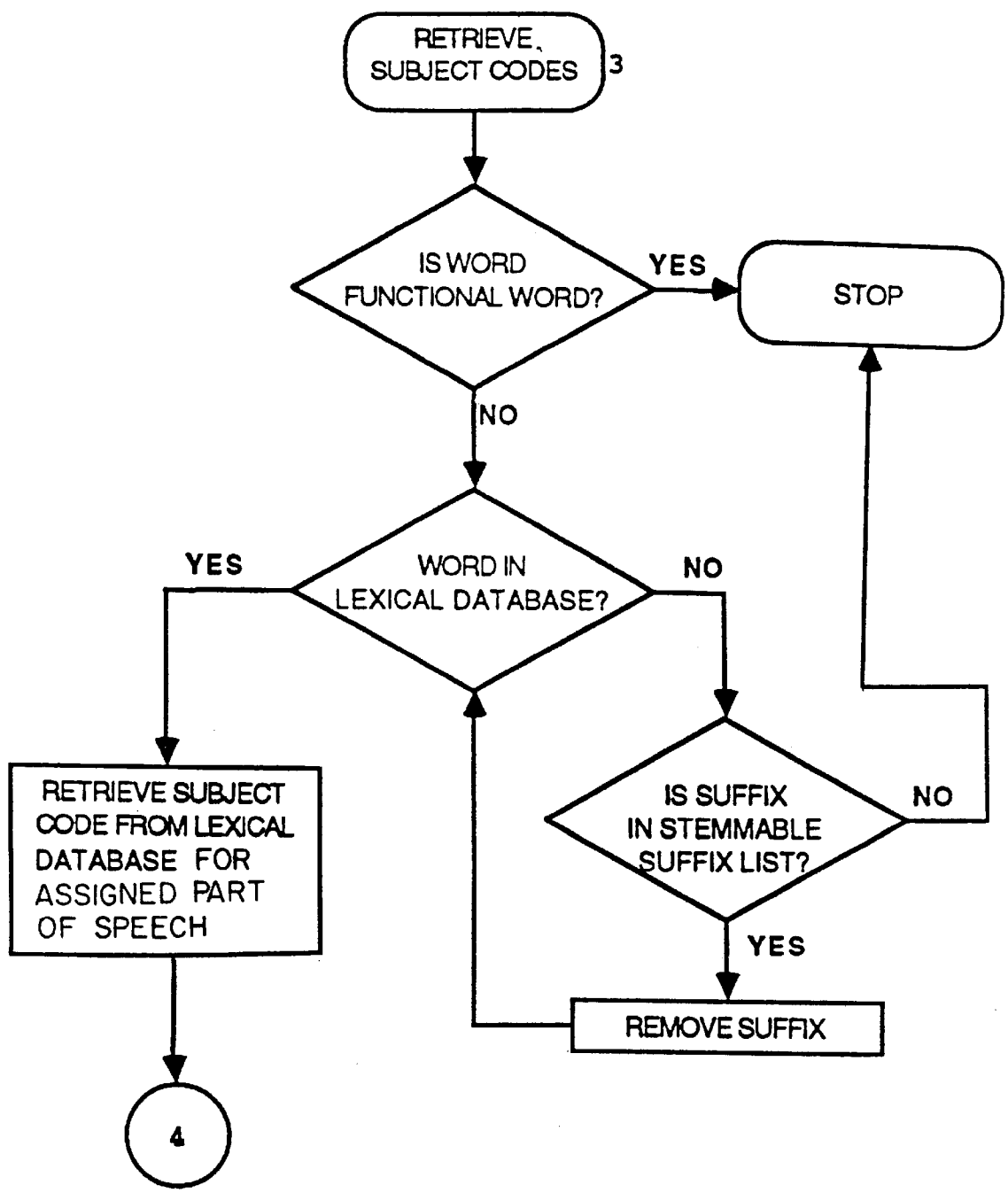

The deletion of functional parts of speech (articles, conjunctions, prepositions, pronouns) is reflected in the general process 3 for retrieval of subject codes of words from lexical database, which is shown in greater detail in FIG. 3. If the word is a functional word, it is disregarded and the system proceeds to the next word. Then the lexical database is searched for the presence of the word. If the word is not in the database, it is stemmed by removal of suffixes which represent inflectional endings of the words. Then the words from which the suffixes are removed are again looked up in the lexical database. If iterative, inflectional stemming of the word does not produce a word which is in the lexical database (lexicon) no further processing of that word will occur and the system proceeds to the next word.

After the dehyphenation, stemming and functional word removal processes, the words are looked up in the lexical database and the subject code or codes for each word's tagged part speech (if the POST system provides information as to the grammatical or syntactic part of speech) is used. If no tagging is used, subject codes for each grammatical category of a word are retrieved.

There may be a plurality (i.e., multiple) subject codes (SFCs) for many of the words. Some words may have only one SFC that is a single or unique code. For example, a word having a single SFC is "billion". The unique SFC for this word is NB for numbers.

An example of a word having multiple SFCs, each for a different sense or meaning of the word, is "abate". That word appears in the machine readable version of LDOCE under two meanings. The first occurring and most common or general usage which is under code XX is given as "(of winds, storms, sounds, pain, etc.) to become less strong; decrease: The recent public anxiety about this issue may now be abating." The second sense is under the subject code LW for the meaning "to bring to an end (especially in the phrase 'abate a nuisance')."

A selection of a single subject code is necessary for each word. In other words, the codes must be disambiguated. The disambiguation process involves a heuristic order of processes which are shown in the flow chart as processes 4 through 7. The first of these processes is the identification of unique or frequent subject codes (process 4) which is shown in greater detail in FIG. 4.

Figure 4:
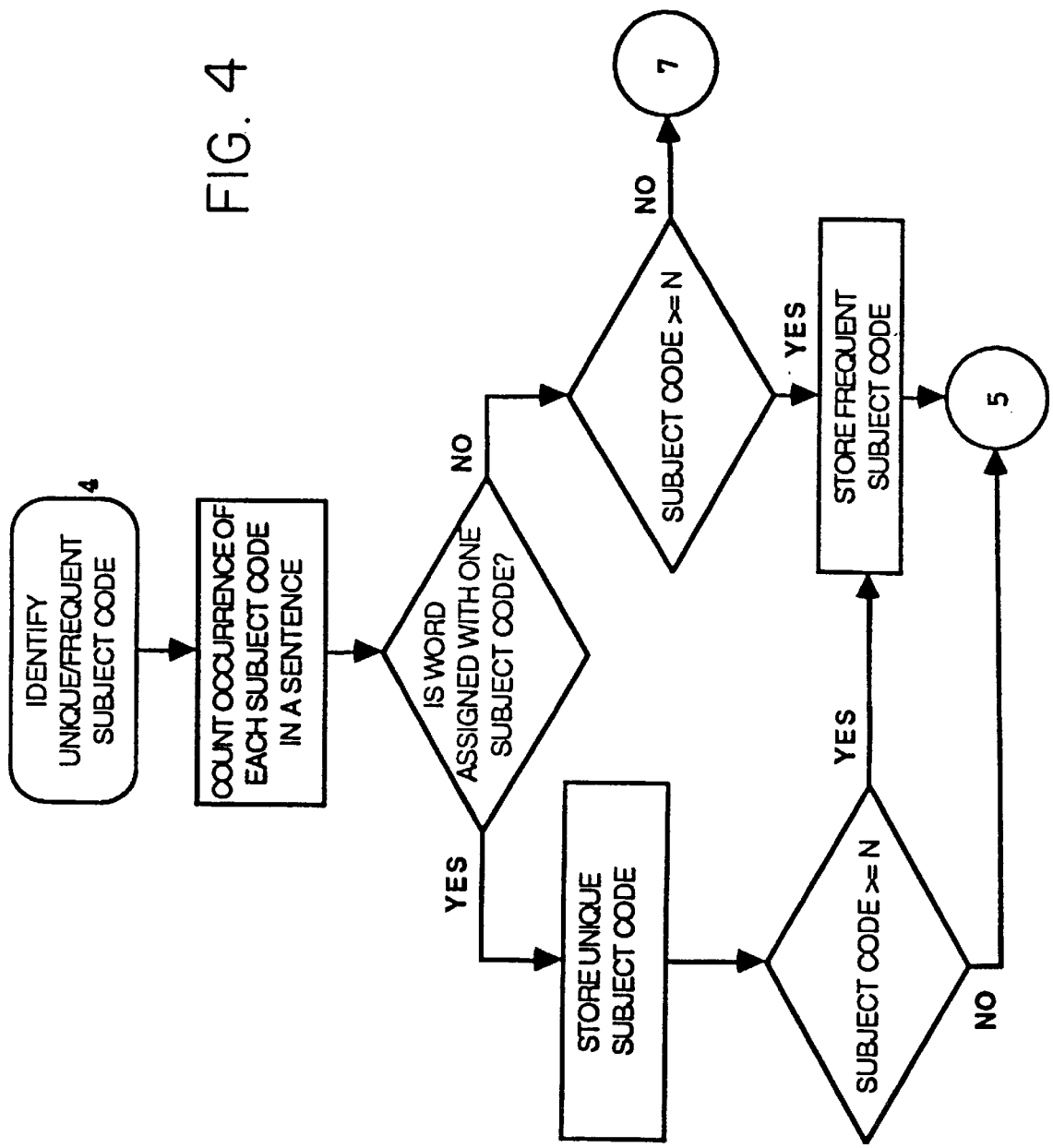
Figure 5:
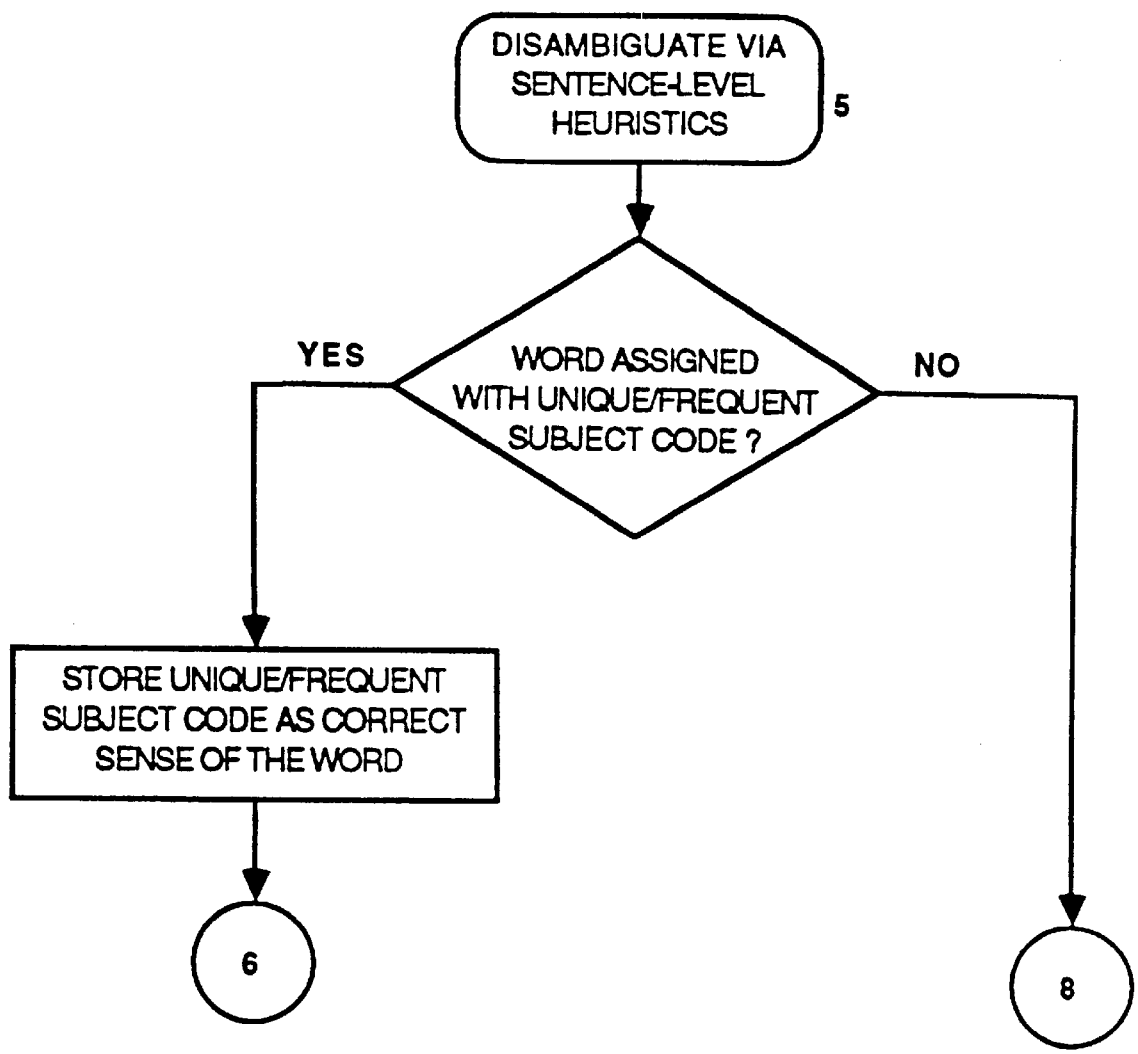

Conceptually, disambiguation is unnecessary for words whose senses have all been assigned the same subject code. However, the assignment of a unique subject code to a word in a sentence is used in the disambiguation of other words in the sentence and is therefore considered to be part of the disambiguation process. Accordingly, the first process is the identification of unique/frequent subject codes. First, a summation of the subject codes across all senses of all words in a sentence is computed and a ranked list of the frequency of each subject code is stored. This is carried out by counting the occurrence of each subject code in a sentence as shown in FIG. 4. If the word is assigned only one subject code that code is stored.

A computation is made as to whether any subject code in the sentence equals or exceeds a predetermined frequency criterion, that is whether the subject code occurs N times or more in the sentence. N depends upon the type of textual subject matter. For newspapers such as the Wall Street Journal, N may suitably be three. For more specialized subject matter, N may be a higher number, sentences or text containing such subject matter usually being longer. For subject codes which equal or exceed the frequency criterion N, the process stores the code which is used as the code for the word and the disambiguation process ends at this step in the heuristic order. If the subject code does not exceed or equal the N frequency criterion, the system proceeds to process 7 to disambiguate the sense or meaning of the word via frequency of usage (process 7), but only after processes 5 and 6 are undertaken.

A word may be assigned a subject code which does not exceed the frequency criterion in the sentence, but is the same as another subject code which was identified in process 4 as a unique or frequent subject code. Then the unique or frequent subject code is stored as the correct subject code (for the correct sense) of the word. However, if neither the frequency criterion or correspondence to a previously assigned unique or frequent subject code for the sentence are met, the system proceeds to process 6 and to provide for disambiguating via a corpus based on subject code correlation. This corpus is a correlation matrix, which as discussed above, mimics the use of domain knowledge by humans in disambiguating different senses of the same word. The SFC correlation matrix may, for example, be obtained by correlating each pair of subject field codes in a corpus of text of the same type as are to be classified by the system. An example of a correlation matrix is shown below in Table B, which contains the highest 400 correlation values computed from 977 Wall Street Journal articles. These values constitute the matrix. The values are in a 122×122 matrix and are the Pearson product moment correlation coefficients between SFCs. Theoretically, these coefficients range from +1 to −1 with 0 indicating no relationship between the SFCs. Only the positive coefficients are used in the matrix in the herein described embodiment of the invention. The correlation coefficients represent the probability that a particular SFC will co-occur with every other SFC in the 977 Wall Street Journal articles. The matrix reflects stable estimates of subject codes which co-occur within documents of a text type being classified. In computing the matrix the subject codes of the senses of the correct grammatical part of speech of each word as determined by the POST system may be used.

Figure 6:
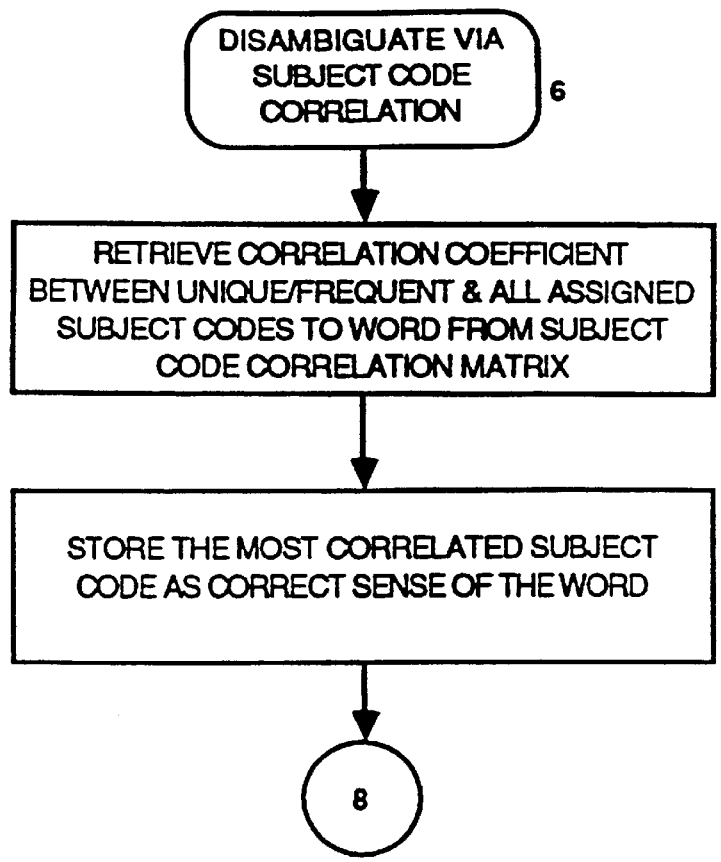
Figure 7:
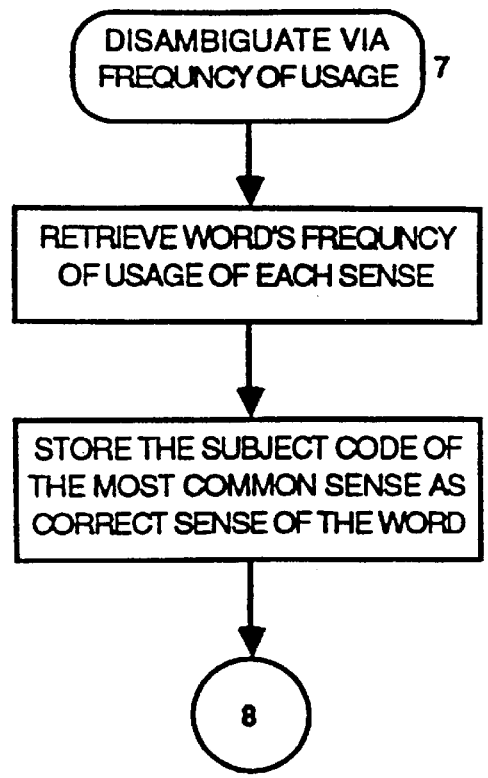

As shown in FIG. 6, one ambiguous word at a time is resolved, accessing the matrix via the unique and high frequency subject codes which have been determined for a sentence containing the word. The system evaluates the correlation coefficients between the unique/frequent subject codes of the sentence and each of the multiple subject codes assigned to the word being disambiguated in order to determine which of the multiple subject codes has the highest correlation with the unique and/or high frequency subject codes. The system then selects that subject code as the unambiguous representation of the sense of the word, that is as the single subject code for the word.

Preferably, if the correlation coefficient is less than a certain value and always if there is no unique or frequent code, the system proceeds to process 7 and disambiguation occurs via frequency of usage. The lexical database records frequency of usage information either explicitly by coding the degree (high, medium or low) of preference of a sense or implicitly by the order in which the senses of a word are listed for the word in the lexical database. Alternatively, a table of usage information which is obtained from analysis of the corpus, the Wall Street Journal articles which are used in the correlation matrix may be used and the code for the word selected by consulting this table and picking the subject code of the sense with the highest general frequency of usage.

The correlation process 6 which is preferred for use with the LDOCE involves three steps, in order to account for a large number of general (XX) or closed system part of speech (CS) codes. There are three cases as shown in the following table which defines the disambiguation step utilizing the correlation matrix.

TABLE 5

Case 1 - Words with no XX or CS SFCs:
  if any word-attached SFC has a correlation greater than .6 with any one of the sentence-determined SFCs, select that word-attached SFC.
  If no word-attached SFC has such a correlation, average the correlations between the word-attached SFC and sentence-determined SFCs correlations, and select the word-attached SFC with the highest average correlation.
Case 2 - Words with XX or CS listed first in LDOCE entry:
  Select the XX or CS unless a more substantive SFC further down the list of senses has a correlation with the sentence-determined SFCS greater than 0.6.
Case 3 - Words where XX or CS is not the first listed SFC in LDOCE entry:
  Choose the more substantive SFC which occurs before XX or CS if it has a correlation greater than 0.4.

Figure 8:
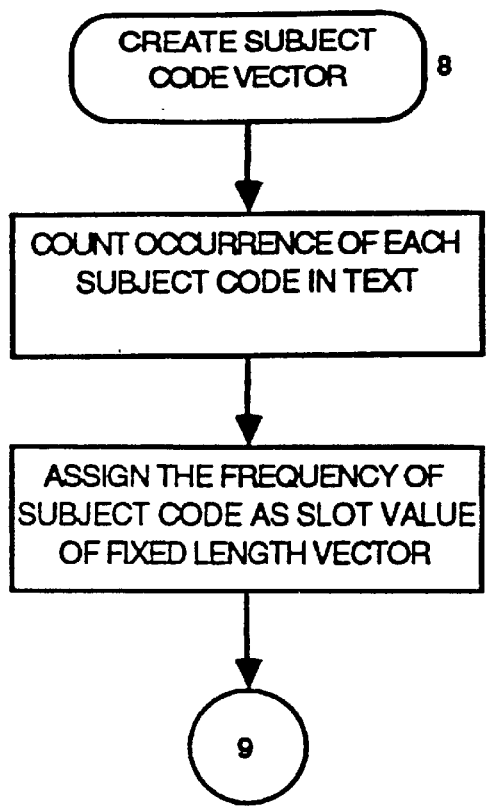

The system proceeds to create a subject field code SFC vector for the document (process 8). As shown in FIG. 8 the single subject code for each word selected by the previous processes for each word are summed for each of the subject codes and the value for each subject code entered into that subject code's slot in the fixed length vector representation of the document (i.e., the unit of text (paragraph, subtext, text)) for which a representation is desired. These values represent the unnormalized subject code frequencies for that document.

Figure 9:
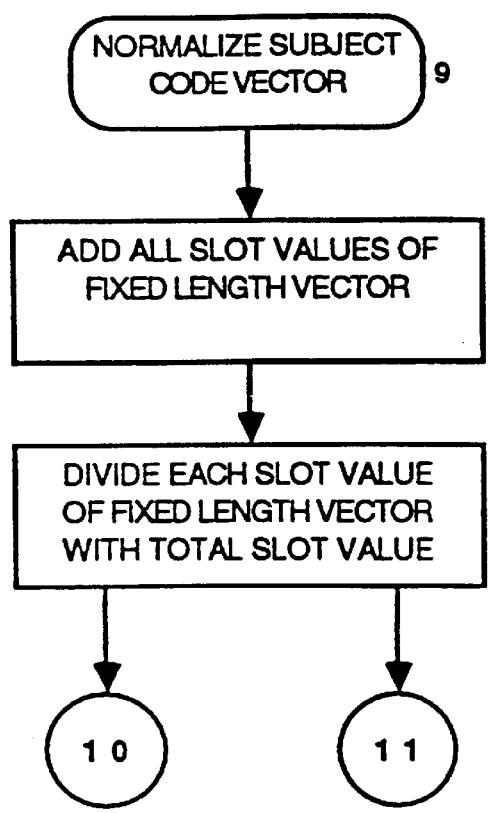
Figure 10:
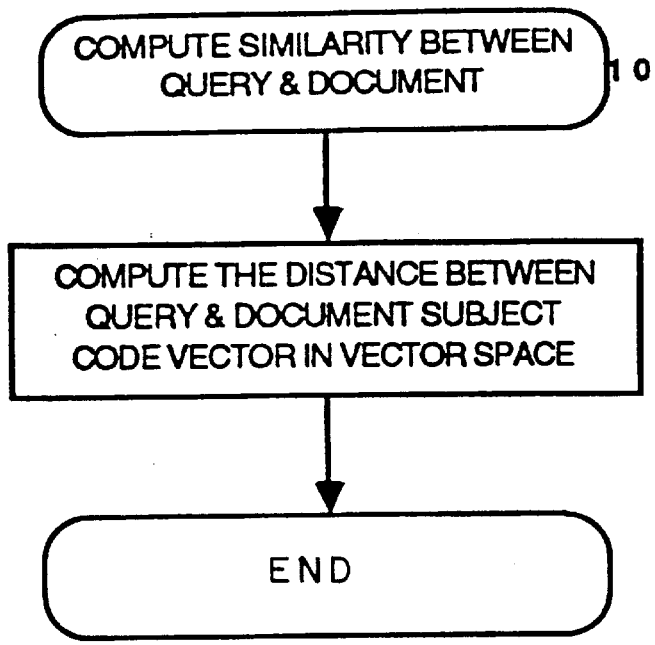
Figure 11:
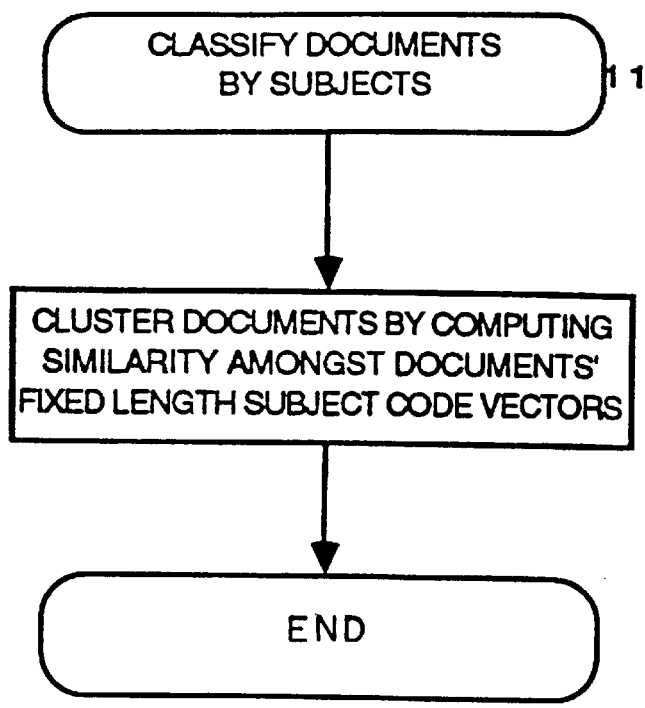

In process 9 the subject code vector is normalized, as shown also in FIG. 9. The sum total of vector slot values in the text is used in order to control the effect of document length. In other words, the sum of all values of the fixed length vector for each subject code in each slot is divided into each slot value to normalize the value in that slot.

For document retrieval the system proceeds to process 10. In order to classify the documents by subject matter, the system proceeds to process 11. See FIGS. 10 and 11. For document retrieval, document routing or document filtering, the similarity between the subject code vector of the query and the subject code vector of each document is computed and the documents are ranked in order of their similarity to the query vector.

For browsing, the documents are clustered using their subject code vectors without regard to a query according to the similarities among the subject code vectors. Various clustering algorithms as discussed in some of the above-referenced articles (3 & 4) by Liddy et al. may be used.

From the foregoing description it will be apparent that there has been provided an improved system (method and apparatus) for document classification and retrieval in accordance with the content (meanings or senses of the words) of the document. Variations and modifications in the herein described system, within the scope of the invention, will undoubtedly suggest themselves to those skilled in the art. Accordingly, the foregoing description should be taken as illustrative and not in limiting sense.

TABLE A

| APPENDIX | |
|---|---|
| AC | architecture |
| AE | aeronautics |
| AF | art painting |
| AG | agriculture |
| AH | animal_husbandry |
| AL | alphabets_letters_of |
| AM | animal_names taxonorny |
| AO | aerospace astronautics |
| AP | anthropology |
| AR | archaelogy |
| AS | astronomy |
| AU | automotive motor_vehicles |
| BB | baseball |
| BD | building |
| BE | beauty_culture |
| BK | basketball |
| BL | Bible_&_Apocrypha |
| BD | botany_(not_plant_names) |
| BV | beverages drinks |
| BW | bowling_and_bowls |
| BZ | business |
| CA | calendar |
| CC | compass |
| CD | card_ames |
| CE | ceramics_(not_glass_making) |
| CG | cartography maps |
| CK | cricket |
| CL | clothing |
| CM | communicatibns |
| CO | colour(s) |
| CS | closed_system_part-of-speech_categories |
| CT | court_games |
| DA | dance |
| DE | dentistry |
| DG | drugs_(not_pharm)_and_drug_slang |
| DP | computer_technology data_processing |
| EC | economics finance |
| ED | education |
| EG | engineering |
| EN | entertainment |
| EQ | equestrian horse_riding manege |

TABLE A-continued

APPENDIX

| | |
|---|---|
| ER | epithets_(abusive) |
| FA | firearms_(not_military) |
| FB | football |
| FD | fire_department |
| FO | food |
| FR | forestry lumbering |
| FU | furniture_and_antiques |
| GA | games |
| GB | gambling |
| GF | golf |
| GL | glass |
| GO | geology_&_geography |
| GY | gymnasium_sports |
| HA | handicrafts_(not_tools,_screws,_parts_=_hardware) do-it-yourself |
| HE | heraldry |
| HF | hunting_and_fishing |
| HH | household do-it-yourself |
| HI | history |
| HK | hockey_and_other_field_games_specified |
| HR | clocks horology watches |
| HW | hardware |
| IN | insurance |
| IS | information_science |
| JW | jewellery |
| KL | handweapons_(not firearms) |
| KN | knots |
| KS | knitting_and_sewing |
| LB | labour trade_union_terminology |
| LN | linguistics_and_grammar parts of_speech |
| LT | literature |
| LW | law |
| MD | medicine_and_biology |
| MF | manufacturing |
| MG | mining_engineenng |
| MH | mathematics arithmetic |
| MI | military |
| ML | climatology |
| MN | mineralogy |
| MP | motion_pictures film_(production) |
| MS | measures_and_weights units |
| MT | metallurgy |
| MU | music |
| MY | mythology_and_legend |
| NA | nautical_(not_navy) |
| NB | numbers |
| NT | net_games |
| NU | numismatic_(currencies) |
| OC | occult magic |
| ON | occupations trades |
| OR | orders |
| OZ | zoology_(not_animal_names) |
| PG | photography |
| PH | philosophy |
| PL | political_science government parlimentary_procedure |
| PM | plant_names taxonomy |
| PN | paints |
| PP | paper |
| PS | psychology |
| PT | printing_and_publishing |
| RA | radio film_(broadcasting) |
| RE | recording hifi |
| RL | religion_(not_Bible) |
| RN | relig_N theology |
| RP | reprography lithography xerography |
| RR | railways |
| RX | pharmacy |
| SC | scouting |
| SI | science |
| SK | sculpture |
| SM | cruel_and_unusua_punishment torture |
| SN | sounds |
| SO | sociology |
| SP | sports |
| ST | philately stamp_collecting |
| TE | textiles |
| TF | athletics track_and_field |
| TH | theatre_(not_drama_terms) |

TABLE A-continued

APPENDIX

| | |
|---|---|
| TN | transport |
| TO | tobacco |
| VH | vehicles_(nonautomotive) |
| WA | water_sports_and_diving_(except_sailing_and_rowing_=_nautical) |
| WI | winter_sports |
| XX | general |

TABLE B

| | | |
|---|---|---|
| 0.81555 | HK | FB |
| 0.81555 | FB | HK |
| 0.68619 | NT | CT |
| 0.68619 | CT | NT |
| 0.67312 | TO | DC |
| 0.67312 | DG | TO |
| 0.62010 | WA | NT |
| 0.62010 | NT | WA |
| 0.54733 | PG | MP |
| 0.54733 | MP | PG |
| 0.51112 | SK | ER |
| 0.51112 | ER | SK |
| 0.49589 | SK | KL |
| 0.49589 | KL | SK |
| 0.47069 | TH | MU |
| 0.47069 | MU | TH |
| 0.46974 | RN | RL |
| 0.46974 | RL | RN |
| 0.44335 | RE | ED |
| 0.44335 | ED | RE |
| 0.43932 | NT | GA |
| 0.43932 | GA | NT |
| 0.43471 | SP | NT |
| 0.43471 | NT | Sp |
| 0.43116 | ML | AS |
| 0.43116 | AS | ML |
| 0.41699 | TH | EN |
| 0.41699 | EN | TH |
| 0.41475 | SK | KN |
| 0.41475 | KN | SK |
| 0.41334 | FU | AP |
| 0.41334 | AF | FU |
| 0.40924 | ER | AR |
| 0.40924 | AR | ER |
| 0.40621 | SN | RA |
| 0.40621 | RA | SM |
| 0.39837 | FA | AO |
| 0.39837 | AO | FA |
| 0.38824 | SP | GA |
| 0.38824 | GA | SP |
| 0.38006 | MN | MG |
| 0.38006 | MG | NN |
| 0.37896 | PM | FR |
| 0.37896 | FR | PM |
| 0.37672 | OR | BK |
| 0.37672 | BK | OR |
| 0.37482 | OZ | MP |
| 0.37482 | MP | OZ |
| 0.36080 | KN | KL |
| 0.36080 | KL | KN |
| 0.35966 | WI | JW |
| 0.35966 | JW | WI |
| 0.34690 | SK | AR |
| 0.34690 | AR | SK |
| 0.33662 | PS | BK |
| 0.33662 | BK | FS |
| 0.33195 | GO | CG |
| 0.33195 | CG | GO |
| 0.32733 | RX | MD |
| 0.32733 | MD | RX |
| 0.30425 | PP | AC |
| 0.30425 | AC | PP |
| 0.29256 | GY | DA |
| 0.29256 | DA | GY |

TABLE B-continued

| | | |
|---|---|---|
| 0.29210 | EN | BW |
| 0.29210 | BW | PN |
| 0.29077 | MT | MG |
| 0.29077 | MG | MT |
| 0.28967 | FR | AM |
| 0.28967 | AM | FR |
| 0.28623 | MF | AG |
| 0.28623 | AG | MF |
| 0.28601 | RR | AC |
| 0.28601 | AC | RR |
| 0.28583 | WA | SP |
| 0.28583 | SP | WA |
| 0.28087 | GA | CT |
| 0.28087 | CT | GA |
| 0.27935 | SK | AF |
| 0.27935 | AP | SK |
| 0.27208 | VH | AU |
| 0.27208 | AU | VH |
| 0.26875 | EQ | CL |
| 0.26875 | CL | EQ |
| 0.26669 | FN | HF |
| 0.26669 | HF | FN |
| 0.26620 | TH | BW |
| 0.26620 | BW | TH |
| 0.26523 | HF | CE |
| 0.26523 | CE | HF |
| 0.26188 | GO | CC |
| 0.26188 | CC | GO |
| 0.24974 | MU | EN |
| 0.24974 | EN | MU |
| 0.24270 | AP | AC |
| 0.24270 | AC | AP |
| 0.24107 | AM | AH |
| 0.24107 | AH | AM |
| 0.23864 | NA | BO |
| 0.23864 | BO | NA |
| 0.23840 | SK | AL |
| 0.23840 | AL | SK |
| 0.23712 | HF | AM |
| 0.23712 | AM | HF |
| 0.23690 | SO | LW |
| 0.23690 | LW | SO |
| 0.22711 | RX | DG |
| 0.22711 | DG | RX |
| 0.22652 | FB | AC |
| 0.22652 | AC | FB |
| 0.22650 | PS | OZ |
| 0.22650 | OZ | PS |
| 0.22260 | SP | BB |
| 0.22260 | BB | SP |
| 0.22002 | SP | BK |
| 0.22002 | BK | SP |
| 0.21999 | MN | CK |
| 0.21999 | CK | MN |
| 0.21980 | PP | AH |
| 0.21980 | AH | PP |
| 0.21714 | EC | BZ |
| 0.21714 | BZ | EC |
| 0.21486 | PS | OR |
| 0.21486 | OR | PS |
| 0.21484 | FR | AH |
| 0.21484 | AH | FR |
| 0.21322 | OZ | IS |
| 0.21322 | IS | OZ |

TABLE B-continued

| | | |
|---|---|---|
| 0.21294 | SI | EG |
| 0.21294 | EG | SI |
| 0.20820 | AH | SC |
| 0.20820 | AC | AH |
| 0.20722 | MT | MN |
| 0.20722 | MN | MT |
| 0.20708 | KL | AL |
| 0.20708 | AL | KL |
| 0.20468 | OZ | HF |
| 0.20468 | HF | OZ |
| 0.20300 | TN | AE |
| 0.20300 | AE | TN |
| 0.19764 | SP | CT |
| 0.19764 | CT | SP |
| 0.19715 | HF | AH |
| 0.19715 | AH | HF |
| 0.19387 | TE | AP |
| 0.19387 | AP | TE |
| 0.19384 | AH | AG |
| 0.19384 | AG | AH |
| 0.19331 | RE | MU |
| 0.19331 | MU | RE |
| 0.18974 | HH | BO |
| 0.18974 | BO | HH |
| 0.18839 | TF | AH |
| 0.18839 | AH | TF |
| 0.18693 | PM | AM |
| 0.18693 | AM | PM |
| 0.18622 | HK | AC |
| 0.18622 | AC | HK |
| 0.18492 | KL | AF |
| 0.18492 | AF | KL |
| 0.18406 | PH | FB |
| 0.18406 | FB | PH |
| 0.18380 | RR | AP |
| 0.18380 | AP | RR |
| 0.18348 | NA | BD |
| 0.18348 | BD | NA |
| 0.18242 | SN | PS |
| 0.18242 | PS | SN |
| 0.17994 | CK | BB |
| 0.17994 | BB | CK |
| 0.17887 | FO | BV |
| 0.17887 | BV | FO |
| 0.17818 | ST | PL |
| 0.17818 | PL | ST |
| 0.17679 | LN | AL |
| 0.17679 | AL | LN |
| 0.17324 | MF | BE |
| 0.17324 | BE | MF |
| 0.17200 | GA | BB |
| 0.17200 | BB | GA |
| 0.17195 | KN | AL |
| 0.17195 | AL | KN |
| 0.17151 | PS | GA |
| 0.17151 | GA | PS |
| 0.17059 | PS | MD |
| 0.17059 | MD | PS |
| 0.16994 | PP | ML |
| 0.16994 | ML | PP |
| 0.16986 | MP | EN |
| 0.16986 | EN | MP |
| 0.16894 | SO | BD |
| 0.16894 | BD | SO |
| 0.16796 | PH | HK |
| 0.16796 | HK | PH |
| 0.16740 | SN | SC |
| 0.16740 | SC | SN |
| 0.16498 | TN | EQ |
| 0.16498 | EQ | TN |
| 0.16361 | ML | KN |
| 0.16361 | KN | ML |
| 0.16324 | FA | AE |
| 0.16324 | AE | FA |
| 0.16114 | PM | BO |
| 0.16114 | BO | PM |
| 0.15994 | MG | CK |
| 0.15994 | CK | MG |
| 0.15905 | PH | BB |
| 0.15905 | BB | PH |
| 0.15740 | TF | CD |
| 0.15740 | CD | TF |
| 0.15628 | MU | DA |
| 0.15628 | DA | MU |
| 0.15557 | PM | KN |
| 0.15557 | KN | PM |
| 0.15446 | KN | AF |
| 0.15446 | AF | KN |
| 0.15212 | EG | CC |
| 0.15212 | CC | EG |
| 0.15176 | PT | PP |
| 0.15176 | PP | PT |
| 0.15109 | SI | AS |
| 0.15109 | AS | SI |
| 0.15067 | MG | HW |
| 0.15067 | HW | MG |
| 0.15019 | TN | AU |
| 0.15019 | AU | TN |
| 0.15004 | AO | AE |
| 0.15004 | AE | AO |
| 0.14996 | TN | TF |
| 0.14996 | TF | TN |
| 0.14965 | PM | AG |
| 0.14965 | AG | PM |
| 0.14964 | PL | MI |
| 0.14964 | MI | PL |
| 0.14940 | VH | TN |
| 0.14940 | TN | VH |
| 0.14893 | GO | CM |
| 0.14893 | CM | GO |
| 0.14879 | MI | CC |
| 0.14879 | CC | MI |
| 0.14843 | LB | BO |
| 0.14843 | BO | LB |
| 0.14617 | JW | CL |
| 0.14617 | CL | JW |
| 0.14606 | SP | OZ |
| 0.14606 | OZ | SP |
| 0.14504 | TE | HH |
| 0.14504 | HH | TE |
| 0.14433 | HF | BV |
| 0.14433 | BV | HF |
| 0.14324 | RR | IS |
| 0.14324 | IS | RR |
| 0.14300 | SP | PS |
| 0.14300 | PS | SP |
| 0.14220 | EQ | AU |
| 0.14220 | AU | EQ |
| 0.14111 | TN | FA |
| 0.14111 | FA | TN |
| 0.14079 | HI | HA |
| 0.14079 | HA | HI |
| 0.14073 | PM | FO |
| 0.14073 | FO | PM |
| 0.14056 | MF | RA |
| 0.14056 | MD | BW |
| 0.14056 | JW | MD |
| 0.14056 | CA | MF |
| 0.13962 | MI | AP |
| 0.13962 | AP | MI |
| 0.13935 | PG | CO |
| 0.13935 | CO | PG |
| 0.13756 | PP | CO |
| 0.13756 | CO | PP |
| 0.13742 | RR | AU |
| 0.13742 | AU | RR |
| 0.13727 | MI | FA |
| 0.13727 | FA | MI |
| 0.13711 | FO | AM |
| 0.13711 | AM | FO |
| 0.13668 | SI | PH |
| 0.13668 | PH | SI |
| 0.13635 | ML | AC |
| 0.13635 | AC | ML |
| 0.13611 | WA | FB |
| 0.13611 | FB | WA |
| 0.13604 | CE | AM |
| 0.13604 | AM | CE |

TABLE B-continued

| | | |
|---|---|---|
| 0.13475 | NT | BK |
| 0.13475 | BK | NT |
| 0.13471 | SP | EN |
| 0.13471 | EN | SP |
| 0.13381 | SI | ML |
| 0.13381 | ML | SI |
| 0.13361 | MS | CA |
| 0.13361 | CA | MS |
| 0.13343 | PT | KS |
| 0.13343 | KS | PT |
| 0.13314 | PL | LW |
| 0.13314 | LW | PL |
| 0.13311 | VH | RR |
| 0.13311 | RR | VH |
| 0.13199 | CO | CL |
| 0.13199 | CL | CO |
| 0.13178 | PS | MP |
| 0.13178 | MP | PS |
| 0.13159 | AS | AO |
| 0.13159 | AO | AS |
| 0.13133 | TN | RR |
| 0.13133 | RR | TN |
| 0.13000 | BW | BV |
| 0.13000 | BV | BW |
| 0.12968 | PT | AL |
| 0.12968 | AL | PT |
| 0.12882 | OZ | AM |
| 0.12882 | AM | OZ |
| 0.12831 | PH | ED |
| 0.12831 | ED | PH |
| 0.12683 | RN | PP |
| 0.12683 | PP | RN |
| 0.12621 | MF | AU |
| 0.12621 | AU | MF |
| 0.12609 | FO | BW |
| 0.12609 | BW | FO |
| 0.12601 | ST | HE |
| 0.12601 | HE | ST |
| 0.12583 | RA | MU |
| 0.12583 | MU | RA |
| 0.12582 | RN | CC |
| 0.12582 | CC | RN |
| 0.12505 | OZ | BE |
| 0.12505 | CE | OZ |
| 0.12501 | EG | AR |
| 0.12501 | AR | EG |
| 0.12408 | SM | EC |
| 0.12408 | EC | SM |
| 0.12394 | MP | IS |
| 0.12394 | IS | MP |
| 0.12380 | SO | NA |
| 0.12380 | NA | SO |
| 0.12309 | SN | ON |
| 0.12309 | ON | SN |
| 0.12306 | PM | BV |
| 0.12306 | BV | PM |
| 0.12292 | PM | AH |
| 0.12292 | AH | PM |
| 0.12203 | HW | AG |
| 0.12203 | AG | HW |
| 0.12098 | GO | CE |
| 0.12098 | CE | GO |
| 0.12009 | PG | AF |
| 0.12009 | AF | PG |
| 0.11925 | SP | SN |
| 0.11925 | SN | SP |
| 0.11870 | SK | EN |
| 0.11870 | EN | SK |
| 0.11859 | WI | CM |
| 0.11859 | CM | WI |
| 0.11854 | TF | MU |
| 0.11854 | MU | TF |
| 0.11823 | TF | SP |
| 0.11823 | SP | TF |
| 0.11751 | MY | BE |
| 0.11751 | BE | MY |
| 0.11643 | OC | HI |
| 0.11643 | HI | OC |
| 0.11640 | TN | AO |
| 0.11640 | AO | TN |
| 0.11607 | RN | PS |
| 0.11607 | PS | RN |
| 0.11605 | WI | AF |
| 0.11605 | AF | WI |
| 0.11584 | HW | BZ |
| 0.11584 | BZ | HW |
| 0.11382 | PH | ON |
| 0.11382 | ON | PH |
| 0.11381 | TF | DA |
| 0.11381 | DA | TF |
| 0.11309 | HH | AF |
| 0.11309 | AF | HH |
| 0.11232 | SP | MP |
| 0.11232 | MP | SP |
| 0.11224 | SO | PL |
| 0.11224 | PL | SO |
| 0.10989 | GA | BK |
| 0.10989 | BK | GA |
| 0.10895 | PP | FO |
| 0.10895 | FO | PP |
| 0.10868 | OR | MY |
| 0.10868 | MY | OR |
| 0.10857 | MP | DA |
| 0.10857 | DA | MP |
| 0.10792 | SP | DA |
| 0.10792 | DA | SP |
| 0.10725 | SM | NU |
| 0.10725 | NU | SM |
| 0.10587 | HE | MU |
| 0.10587 | AU | HE |
| 0.10562 | MT | MF |
| 0.10562 | MF | MT |
| 0.10561 | SP | OR |
| 0.10561 | OR | SP |

We claim:

1. A method of generating a subject field code vector representation of a document which comprises the steps of assigning subject codes to each of the words of the document which codes express the semantic content of the document, said codes corresponding to the meanings of each of said words in accordance with the various senses thereof; disambiguating said document to select a specific subject code for each of said words heuristically in order first from the occurrence of like codes within each sentence of said documents which occur uniquely and at or with greater than a certain frequency within each sentence, then second correlating the codes for each word with the codes occurring uniquely (unique code) and with greater than or equal to the given frequency in the sentence to select for each word the code having the highest correlation, and then third in accordance with the frequency of usage of the meaning of the word represented by the code; and arranging said codes into a weighted vector representing the content of said document.

2. The method according to claim 1 wherein said assigning step comprises selecting said codes by searching a lexical database for codes for said words.

3. The method according to claim 1 wherein said assigning step further comprises conjoining those of said words which are hyphenated and searching said database for codes which correspond to said conjoined words.

4. The method according to claim 3 wherein said assigning step further comprises the step of separating said separated words into composite parts and searching said database for codes corresponding to said parts when codes for said conjoined words are not identified upon searching of the said database.

5. The method according to claim 1 further comprising the step of assigning the most likely syntactic (grammatical) part of speech for each of said words in said sentence, and said assigning step is carried out to select subject codes consistent with the grammatical part of speech of said word thereby reducing the number of subject codes corresponding to polysemous meanings of said words.

6. The method according to claim 1 wherein said assigning step is carried out with the aid of a lexical database which contains subject codes for polysemous meanings of said words as different grammatical parts of speech, and further comprising the step of assigning most likely grammatical parts of speech for each of said words in each of the sentences of said documents, and said assigning step is carried out on a set of meanings which is reduced to the meanings for the grammatical parts of speech for said words.

7. The method according to claim 2 wherein said step of assigning subject codes includes the steps of stemming suffixes of said words which are not found in said lexical database and repeating searching of said database for said words without said suffixes.

8. The method according to claim 1 wherein said disambiguating step is carried out to select the single subject code for each of said words which assigned a plurality of subject codes and includes selecting as the unique subject code the one and only subject code which is assigned in said subject code assigning step, said selection of said unique code being done first in the first step in said heuristic order.

9. The method according to claim 8 wherein said unique subject code is stored as the subject code of said word and the other parts in said heuristic order in said disambiguating step are not carried out.

10. The method according to claim 8 wherein said first step in said heuristic order comprises the step of computing the frequency of occurrence of like subject codes, and selecting as the subject code for each word the code which has occurred at or greater than a certain frequency (N times) in the sentence containing that word, where N depends upon the type of document.

11. The method according to claim 10 wherein the first step in said heuristic order further comprises selecting from a plurality of subject codes for each word, the one of said plurality of subject codes like said unique code when said unique code is found, and when such unique code is not found, by a subject code which occurs at or greater than said certain frequency N in the sentence.

12. The method according to claim 11 wherein said subject code for the most common meaning of the word is selected where there are more than a single subject code for the word which occurs at or greater than said certain frequency N.

13. The method according to claim 12 wherein the second step in said heuristic order carries out said correlating of the codes, when a single code is not selected upon said first step in said order, and with the aid of a matrix of correlation of coefficients representing the probability of co-occurrence of subject codes in a type of document.

14. The method according to claim 13 wherein the correlation coefficients are Pearson product moment correlation coefficients for different pairs of subject codes in a lexical database which provides said codes for said words.

15. The method according to claim 13 wherein said second step further comprises selecting the single code from a plurality of codes for each of said words, the correlation coefficient of which with codes selected from the group consisting of the unique code and the code which occurs at greater than said certain frequency N is the highest.

16. The method according to claim 15 wherein said third step in said heuristic order is carried out for each of said words in said sentence when the highest correlation is less than a certain value or when said unique and greater than said certain frequency codes are absent in the sentence.

17. The method according to claim 16 wherein said third step further comprises selecting said single code for each of said words which has a plurality of codes in the lexical database of codes for said word as the code for the meaning having the most general usage.

18. The method according to claim 17 wherein the first code listed in said database is selected as the code for the meaning having the most general usage.

19. The method according to claim 1 wherein said arranging step comprises the steps of computing a fixed length vector representation of the document which has a plurality of slots, a different one of which is assigned to each subject code, and entering a value corresponding to the frequency of occurrence of the code in its assigned slot, and normalizing the vector by the sum of the total of the values in each of said slots to compensate for document length and to provide said vector representation of the content of said document.

20. The method according to claim 19 further comprising the step of arranging a plurality of documents for examination by clustering said documents in accordance with similarities in their respective vector representations.

21. Apparatus for generating a subject field code vector representation of a document which comprises means for assigning subject codes to each of the words of the document which codes express the semantic content of the document, said codes corresponding to the meanings of each of said words in accordance with the various senses thereof; means for disambiguating said document to select a specific subject code for each of said words heuristically in order first from the occurrence of like codes within each sentence of said documents which occur uniquely and at or with greater than a certain frequency within each sentence, then second correlating the codes for each word with the codes occurring uniquely (unique code) and with greater than or equal to the given frequency in the sentence to select for each word the code having the highest correlation, and then third in accordance with the frequency of usage of the meaning of the word represented by the code; and means for arranging said codes into a weighted vector representing the content of said document.

22. The apparatus according to claim 21 wherein said assigning means comprises means for selecting said codes by searching a lexical database for codes for said words.

23. The apparatus according to claim 21 wherein said assigning means further comprises means for conjoining those of said words which are hyphenated and searching said database for codes which correspond to said conjoined words.

24. The apparatus according to claim 23 wherein said assigning means further comprises means for separating said separated words into composite parts and searching said database for codes corresponding to said parts when codes for said conjoined words are not identified upon searching of the said database.

25. The apparatus according to claim 21 further comprising means for assigning the most likely syntactic (grammatical) part of speech for each of said words in said sentence, and means for selecting subject codes consistent with the grammatical part of speech of said word thereby reducing the number of subject codes corresponding to synonymous meanings of said words.

26. The apparatus according to claim 21 further comprises means for searching a lexical database which contains subject codes for synonymous meanings of said words as different grammatical parts of speech, and further comprising means for assigning most likely grammatical parts of speech for each of said words in each of the sentences of said documents, and said assigning means is operative upon set of meanings which is reduced to the meanings for the grammatical parts of speech for said words.

27. The apparatus according to claim 22 wherein said means for assigning subject codes includes means for stemming suffixes of those of said words which are not found in said lexical database and means for repeating searching of said database for said words without said suffixes.

28. The apparatus according to claim 21 wherein said disambiguating means includes means for selecting the single subject code for each of said words, which is assigned a plurality of subject codes as the unique subject code the one and only subject code, said selecting means of said unique code which is assigned by said assigning means being operative first in said heuristic order.

29. The apparatus according to claim 28 further comprising means for storing said unique subject code as the subject code of said word and terminating operation of said said disambiguating means.

30. The apparatus according to claim 28 wherein said disambiguation means operating firstly in said heuristic order comprises means for computing the frequency of occurrence of like subject codes, and means for selecting as the subject code for each word the code which has occurred at or greater than a certain frequency (N times) in the sentence containing that word, where N depends upon the type of document.

31. The apparatus according to claim 30 wherein the disambiguating means firstly operating in said heuristic order further comprises means for selecting from a plurality of subject codes for each word none of which occur in the sentence containing said word at or greater than said certain frequency N, the one of said plurality of subject codes like said unique code when said unique code is found, and when such unique code is not found, like a subject code which occurs at or greater than said certain frequency N in the sentence.

32. The apparatus according to claim 31 wherein said disambiguating means includes means operative to select the subject code for the most common meaning of the word and which occurs first in a lexical database of said subject codes for different words where there are more than a single subject code for the word which occurs at or greater than said certain frequency N.

33. The apparatus according to claim 32 wherein the disambiguating means second operating in said heuristic order comprises means for correlating of the codes when a single code is not selected upon said firstly occurring operations in said order, and further comprises means which stores a matrix of correlation coefficients representing the probability of co-occurrence of subject codes in a type of document.

34. The apparatus according to claim 33 wherein the correlation coefficients are Pearson product moment correlation coefficients for different pairs of subject codes in a lexical database which provides said codes for said words.

35. The apparatus according to claim 33 wherein said disambiguating means which is secondly operative further comprises means for selecting the single code from a plurality of codes for each of said words, the correlation coefficient of which with codes selected from the group consisting of the unique code and the code which occurs at greater than said certain frequency N is the highest.

36. The apparatus according to claim 35 wherein said disambiguating means which is thirdly operative in said heuristic order upon each of said words in said sentence when the highest correlation is less than a certain value or when said unique and greater than said certain frequency codes are absent in the sentence.

37. The apparatus according to claim 36 wherein said thirdly operative part of said disambiguating means further comprises means for selecting said single code for each of said words which has a plurality of codes in the lexical database of codes for said word as the code for the meaning having the most general usage.

38. The apparatus according to claim 37 wherein said means for selecting in said thirdly operative part is operative to select the first code listed in said database as the code for the meaning having the most general usage.

39. The apparatus according to claim 21 wherein said arranging means comprises means for computing a fixed length vector representation of the document which has a plurality of slots, a different one of which is assigned to each subject code, and means for entering a value corresponding to the frequency of occurrence of the code in its assigned slot, and means for normalizing the vector by the sum of the total of the values in each of said slots to compensate for document length and to provide said vector representation of the content of said document.

40. The apparatus according to claim 39 further comprising the means for arranging a plurality of documents for examination by clustering said documents in accordance with similarities in their respective vector representations.

41. The method according to claim 19 further comprising the steps of generating a subject vector representation for a query, and arranging a plurality of documents in ranked order of this subject vector representation's decreasing similarity to the query's subject vector representation.

42. The apparatus according to claim 40 further comprising means for generating a subject vector representation for a query, and means for arranging a plurality of documents in ranked order of this subject vector representation's decreasing similarity to the query's subject vector representation.

43. The method according to claim 13 wherein the correlation matrix is produced by the steps of selecting a collection of documents from a similar source; generating subject code vector representations of the documents in the collection without disambiguation, computing correlation coefficients of the subject codes by product moment correlation to provide said coefficients for each set of subject codes as said matrix.

44. The method according to claim 43 further comprising the steps of repeating the step generating the subject code vectors with disambiguation using said matrix, repeating the step of computing the correlation coefficients to provide another set of correlation coefficients as said matrix.

45. A natural language processing system comprising:

means for disambiguating words of a document to provide codes for said words responsive to the meaning and frequency of said words; and means for generating a representation of the document responsive to said codes.

46. An apparatus for generating a vector representation of a document having on or more sentences comprising:

means for selecting subject codes for the words of the document responsive to the meaning and frequency of the words in each said sentence; and means for arranging said codes into the vector representation of the document.

* * * * *